United States Patent
Han et al.

(10) Patent No.: US 8,121,622 B2
(45) Date of Patent: Feb. 21, 2012

(54) METHOD AND SYSTEM FOR PROVIDING LOCATION MEASUREMENT OF NETWORK BASED TO MOBILE COMMUNICATION TERMINAL BY USING G-PCELL DATABASE ACCORDING TO LOCATION

(75) Inventors: Gyuyoung Han, Gyeonggi-do (KR); Chaehwan Cho, Seoul (KR)

(73) Assignee: SK Telecom Co., Ltd. (KR)

( * ) Notice: Subject to any disclaimer, the term of this patent is extended or adjusted under 35 U.S.C. 154(b) by 336 days.

(21) Appl. No.: 12/595,563

(22) PCT Filed: May 29, 2007

(86) PCT No.: PCT/KR2007/002606
§ 371 (c)(1),
(2), (4) Date: Oct. 12, 2009

(87) PCT Pub. No.: WO2008/126959
PCT Pub. Date: Oct. 23, 2008

(65) Prior Publication Data
US 2010/0113063 A1    May 6, 2010

(30) Foreign Application Priority Data
Apr. 13, 2007  (KR) .................. 10-2007-0036609

(51) Int. Cl.
*H04W 24/00* (2009.01)
(52) U.S. Cl. .................. 455/456.5; 455/456.1; 455/433
(58) Field of Classification Search ....... 455/456.1–457, 455/423–425, 67.11, 433
See application file for complete search history.

(56) References Cited

U.S. PATENT DOCUMENTS

| | | | | |
|---|---|---|---|---|
| 6,198,935 B1 * | 3/2001 | Saha et al. | ................ | 455/456.2 |
| 6,236,365 B1 * | 5/2001 | LeBlanc et al. | ............... | 342/457 |
| 6,952,181 B2 * | 10/2005 | Karr et al. | ..................... | 342/457 |
| 7,058,411 B2 * | 6/2006 | Chen et al. | ................. | 455/456.1 |
| 7,200,392 B2 * | 4/2007 | Kennedy et al. | .............. | 455/423 |
| 7,262,731 B2 * | 8/2007 | Han | ......................... | 342/357.22 |
| 7,474,896 B2 * | 1/2009 | Mohi et al. | ................. | 455/456.1 |
| 7,714,779 B2 * | 5/2010 | Abraham | ................. | 342/357.31 |
| 7,916,071 B2 * | 3/2011 | Harper | ..................... | 342/357.31 |
| 7,974,639 B2 * | 7/2011 | Burroughs et al. | ......... | 455/456.2 |
| 8,032,151 B2 * | 10/2011 | Paulson et al. | ............. | 455/456.1 |
| 2001/0044309 A1 * | 11/2001 | Bar et al. | ...................... | 455/456 |
| 2007/0072624 A1 * | 3/2007 | Niemenmaa et al. | ....... | 455/456.1 |
| 2008/0228654 A1 * | 9/2008 | Edge | ............................. | 705/71 |
| 2008/0278373 A1 * | 11/2008 | Monnerat | ................ | 342/357.09 |
| 2010/0062792 A1 * | 3/2010 | Han et al. | ................... | 455/456.2 |

* cited by examiner

*Primary Examiner* — Sharad Rampuria
(74) *Attorney, Agent, or Firm* — Baker & Hostetler LLP

(57) ABSTRACT

Disclosed is a system and method for providing a mobile communication terminal with network-based location measurement according to locations by using a G-pCell database. The system includes an NPS for storing a neighboring base station database and a G-pCell database; and an SPC for detecting the location of a base station by parsing a base station signal received from the mobile communication terminal when a location measurement request signal is received from the mobile communication terminal, and determining a location of the mobile communication terminal by using a G-pCell pattern matching algorithm when the number of base stations neighboring the mobile communication terminal, detected by parsing the base station signal, is less than the stored number of neighboring base stations corresponding to the location of the base station, discovered using the neighboring base station database. Considering that the accuracy of location measurement may be lowered when the G-pCell pattern matching algorithm is applied to the upper stories of a high-rise building in an area where high-rise buildings stand closely together, such as a downtown area, the system and method selectively uses the G-pCell pattern matching algorithm or a location measurement algorithm based on triangulation to position a mobile communication terminal according to a rough location of the mobile communication terminal, thereby further improving the accuracy of location measurement.

8 Claims, 7 Drawing Sheets

METHOD AND SYSTEM FOR PROVIDING LOCATION MEASUREMENT OF NETWORK BASED TO MOBILE COMMUNICATION TERMINAL BY USING G-PCELL DATABASE ACCORDING TO LOCATION

TECHNICAL FIELD

The present invention relates to a method and system for providing a mobile communication terminal with network-based location measurement according to locations by using a G-pCell database. More particularly, the present invention relates to a method and system for positioning a mobile communication terminal, which reflects the geographical characteristics of base stations by selecting either a pattern matching algorithm using a G-pCell database or a TDOA algorithm as a positioning algorithm according to the number of base stations neighboring the mobile communication terminal when network-based location measurement is performed.

BACKGROUND ART

A variety of wireless communication services utilizing wireless communication networks and wireless communication terminals have been developed in tandem with the rapid progress in electronic and communication technologies. Conventional services include wireless voice communication services providing mobile communication terminal users with wireless voice communication regardless of time and space, and text message services supplementing the voice communication services.

In line with the development of the wireless Internet, wireless Internet services have also launched in recent years, which provide mobile communication service subscribers with Internet communication services via wireless communication networks, so that many enterprises are conducting R&D on the wireless Internet.

Among various wireless Internet services using mobile communication terminals, much attention has recently been paid to an LBS (Location Based Service) due to its wide range of usefulness and convenience. The LBS refers to a communication service for positioning a mobile communication terminal and providing additional information based on the positioning result. The LBS is used in various fields and situations, including emergency aid requests, responses to crime reports, GIS (Geographical Information System) for providing information regarding adjacent areas, differentiation of mobile communication fees according to locations, traffic information, vehicle navigation, logistics control, location-based CRM (Customer Relationship Management), etc.

A location measurement scheme for providing a mobile communication terminal with the LBS is largely divided into a network-based scheme in which the location of a mobile communication terminal is measured by determining the location on a software basis by using a propagation environment (i.e. cell radius of a base station in a mobile communication network), a handset-based scheme using a GPS (Global Positioning System) receiver provided in a mobile communication terminal, and a hybrid scheme combining both the schemes.

The A-GPS scheme is a type of handset-based scheme, which can be used in both a network based on European GSM (Global System for Mobile Communication) using the TDMA (Time Division Multiple Access) wireless access scheme and a network based on IS-95 using the CDMA (Code Division Multiple Access) wireless access scheme. According to the GSM wireless access scheme, a mobile communication terminal is positioned by transmitting/receiving messages through an OMA SUPL (Secure User Plane Location) interface between the mobile communication terminal incorporating a GPS receiver and the SPC (SUPL Positioning Center) within the GSM network and through an SUPL POS for A-GPS location measurement within the OMA SUPL (i.e. GSM A-PGS protocol incorporating an RRLP (Radio Resource Location Protocol)). This type of positioning is very accurate because satellite signals are received from at least four GPS satellites to measure the location of a mobile communication terminal. Such an A-GPS system includes an SPC (SUPL Positioning Center) for receiving satellite signals received by a mobile communication terminal and calculating the location thereof, and an SLC (SUPL Location Center) for processing the calculation based on information regarding base stations within the GSM mobile communication network or associating the information with other systems.

The E-OTD (Enhanced Observed Time Difference) scheme is a typical network-based location measurement scheme, and has been standardized through LCS Release 98 and 99 by the GSM standardization committee of the European TDMA-based GSM scheme using the TDMA wireless access standard. According to the E-OTD scheme, a mobile communication terminal is positioned by calculating the relative differences in time of arrival and distance between signals received from at least three base stations. In other words, the E-OTD scheme uses a combination of various time difference concepts, including OTD (Observed Time Difference), RTD (Relative Time Difference), GTD (Geometric Time Difference), and the like, for network-based location calculation.

The OTD refers to the difference in time of arrival of signals from two base stations to a mobile communication terminal, and can be obtained by measuring the UE Rx-Tx time difference type 2 parameter in a GSM-based mobile communication terminal.

The RTD refers to a parameter used to obtain the difference in starting time of signals transmitted from two base stations, and can only be measured by equipping each of the base stations with a separate measuring device, that is, an LMU (Location Measurement Unit). This means that, in performing network location calculation in the E-TOD scheme, the RTD as well as the OTD must be obtained in order to evaluate the key parameter necessary for network-based location calculation recommended by the GSM standard, that is, "GTD=OTD−RTD".

According to network-based location measurement technology, data (PPM, OTD, RTD, etc.) measured by a mobile communication terminal and an LMU is transmitted to a location measurement server according to a protocol (IS-801, RRLP, RRC, etc.) prearranged between the mobile communication terminal and the server, and the location measurement server performs a function of measuring the location of the corresponding mobile communication terminal by using the data (PPM, OTD, RTD, etc.) measured by the mobile communication terminal. The location measurement server conducts network-based location measurement (i.e. location measurement scheme in which a server side measures the location of a terminal that has requested location measurement, excluding location measurement schemes using GPS satellites), and transmits a result thereof to the requesting party (SLC, CP (Contents Provider), mobile communication terminal that has requested the corresponding service, etc).

The network-based location measurement technology includes a cell ID scheme using cells within a base station radius, an AOA (Angle of Arrival) scheme in which a base station conducts location calculation by receiving signals transmitted by a mobile communication terminal and calculating LOB (Line of Bearing), a TOM (Time of Arrival) scheme in which a mobile communication terminal calculates location based on the time of arrival of radio waves transmitted from at least three base stations, and a TDOA (Time Difference of Arrival) scheme in which a mobile communication terminal measures the difference in time of arrival of pilot signals received from three base stations to calculate the difference in distance between the base stations and determines the point of intersection of two resulting hyperbolas as its location.

However, the aforementioned conventional network-based location measurement schemes have the following problems:

Firstly, when data regarding parameters (i.e. time and distance) measured by a mobile communication terminal or a mobile communication network is used for triangulation or calculation of the point of intersection of hyperbolas, repeaters heavily affect a result thereof. This means that, in the case of using repeaters, data regarding the time and distance between a base station and a mobile communication terminal, measured by the mobile communication terminal, is delayed relative to the original data, which degrades the accuracy of location measurement.

Secondly, in the case of triangulation using time and distance measurement parameters in an asynchronous mobile communication network (GSM, W-CDMA, etc.), the result of location measurement can be obtained from the calculation formula only by measuring not only the OTD measured by a mobile communication terminal, but also the RTD value measured by an additional LMU equipped with separate GPS equipment. Considering that it has little merit per investment to additionally install LMUs in the entire mobile communication network for the network-based location measurement, network-based location measurement using triangulation cannot be used in a region where no LMU is installed.

Thirdly, when a base station is rearranged, the latitude and longitude data of the rearranged base station is not instantly reflected, so that it is impossible to confirm whether or not the latitude and longitude data referred to for location measurement is identical to the latitude and longitude data of the rearranged base station.

Finally, since characteristics regarding mobile communication base stations and sectors are different according to network-based location measurement technologies, excessive human and material resources are required to optimize parameters that are differently used by the respective base stations or sectors for the purpose of improving the accuracy of location measurement, which slows down the commercialization.

DISCLOSURE

Technical Problem

Therefore, the present invention has been made to solve at least the above-mentioned problems, and the present invention provides a method and system for positioning a mobile communication terminal, which reflects the geographical characteristics of base stations by selecting either a pattern matching algorithm using a G-pCell database or a TDOA algorithm as a positioning algorithm according to the number of base stations neighboring the mobile communication terminal when network-based location measurement is performed.

Technical Solution

In accordance with an aspect of the present invention, there is provided a system for providing a mobile communication terminal with network-based location measurement through a mobile communication network by using a G-pCell database, the system including an NPS (Network Position Server) for storing a neighboring base station database and a G-pCell database; and an SPC (SUPL (Secure User Plane Location) Positioning Center) for detecting a location of a base station by parsing a base station signal received from the mobile communication terminal when a location measurement request signal is received from the mobile communication terminal, and determining a location of the mobile communication terminal by using a G-pCell pattern matching algorithm when the number of base stations neighboring the mobile communication terminal, detected by parsing the base station signal, is less than the stored number of neighboring base stations corresponding to the location of the base station, discovered using the neighboring base station database.

In accordance with another aspect of the present invention, there is provided a method of providing a mobile communication terminal with network-based location measurement through a mobile communication network by using a G-pCell database in a system including the mobile communication network, an SPC (SUPL (Secure User Plane Location) Positioning Center), and an NPS (Network Position Server), the method including the steps of (a) receiving a location measurement request signal from the mobile communication terminal; (b) receiving a base station signal from the mobile communication terminal to detect a location of a base station; (c) discovering the stored number of neighboring base stations corresponding to the location of the base station by using a neighboring base station database stored in the NPS; (d) detecting the number of base stations neighboring the mobile communication terminal by parsing the base station signal; and (e) when the number of the base stations neighboring the mobile communication terminal is less than the stored number of the neighboring base stations, determining a location of the mobile communication terminal by using a G-pCell pattern matching algorithm.

ADVANTAGEOUS EFFECTS

Considering the fact that the accuracy of location measurement may be lowered when the G-pCell pattern matching algorithm is applied to the upper stories of a high-rise building in an area where high-rise buildings stand closely together, such as a downtown area, the present invention selectively uses the G-pCell pattern matching algorithm or a location measurement algorithm based on triangulation to position a mobile communication terminal according to a rough location of the mobile communication terminal, thereby further improving the accuracy of location measurement.

DESCRIPTION OF DRAWINGS

The foregoing and other objects, features, and advantages of the present invention will become more apparent from the following detailed description when taken in conjunction with the accompanying drawings in which.

<Reference numerals>

| | | | |
|---|---|---|---|
| 100: | mobile communication terminal | 110: | base station |
| 112: | base station controller | 120: | MSC |
| 130: | CCS7 network | 140: | SMSC |
| 142: | home location register | 150: | gateway |
| 160: | SGSN | 162: | GGSN |
| 164: | WAP gateway | 170: | SPC |
| 172: | NPS | 180: | SLC |
| 190: | CP | 610: | CMS |
| 620: | BSM | | |

MODE FOR INVENTION

Hereinafter, preferred embodiments of the present invention will be described in detail with reference to the accompanying drawings. It is to be noted that the same reference numerals are used to designate the same elements throughout the specification. In addition, detailed descriptions of known functions and configurations incorporated herein is omitted to avoid making the subject matter of the present invention unclear.

Figure 1:
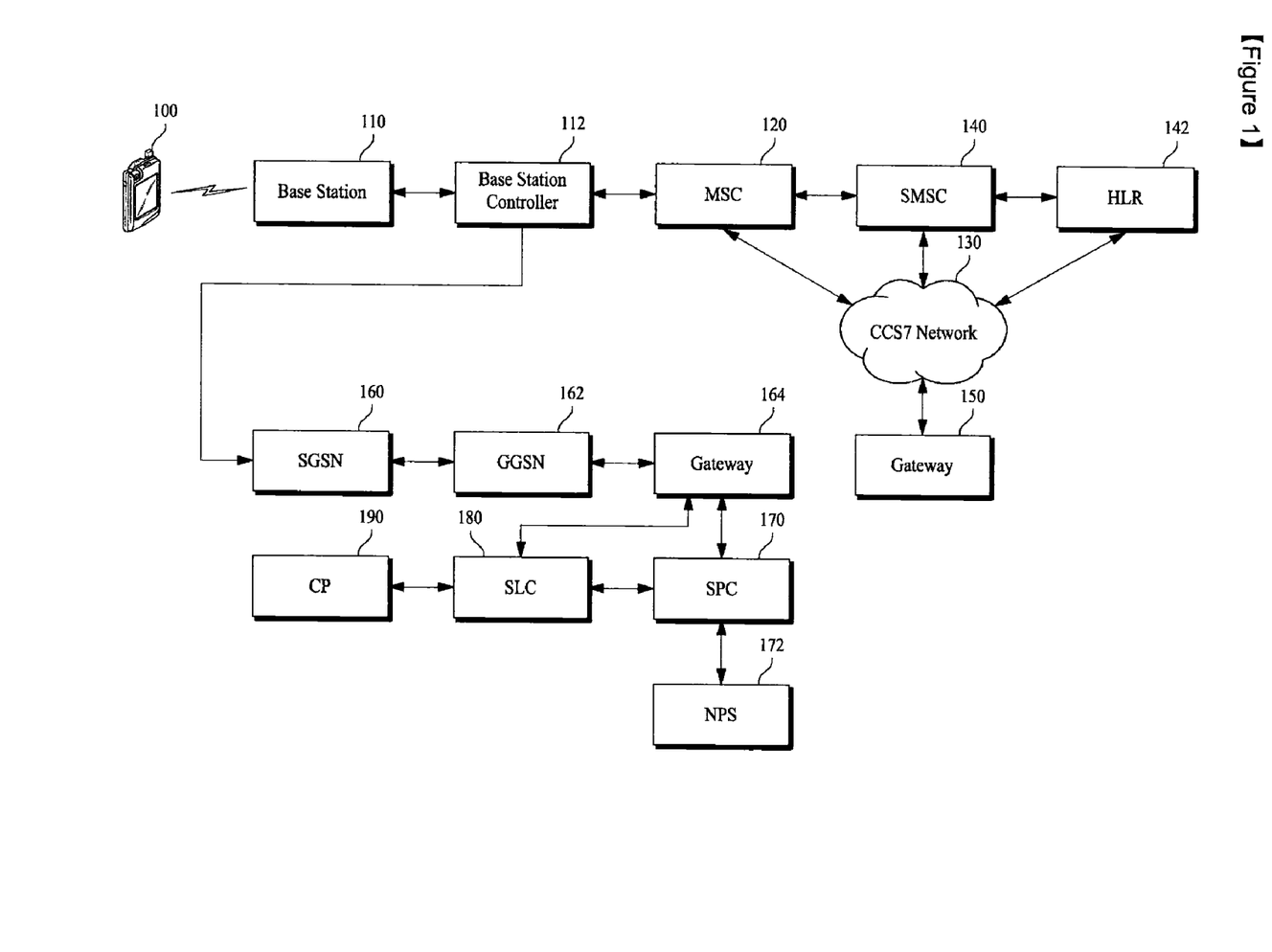
FIG. 1 is a block diagram schematically illustrating a system for providing a mobile communication terminal with network-based location measurement by using a G-pCell database in accordance with a preferred embodiment of the present invention.

FIG. 1 schematically illustrates a system for providing a mobile communication terminal with network-based location measurement by using a G-pCell database according to a first preferred embodiment of the present invention.

The system for providing a mobile communication terminal with network-based location measurement by using a G-pCell database according to the first embodiment of the present invention includes a mobile communication terminal 100, a base station 110, a base station controller 112, an MSC (Mobile Switching Center) 120, a CCS7 network 130, an SMSC (Short Message Service Center) 140, a home location register 142, a gateway 150, an SGSN (Serving GPRS Support Node) 160, a GGSN (Gateway GPRS Support Node) 162, a WAP gateway 164, an SPC (SUPL Positioning Center) 170, an NPS (Network Positioning Server) 172, an SLC (SUPL Location Center) 180, and a CP (Contents Provider) 190.

In the following description, a network including the base station 110, the base station controller 120, the CCS7 network 130, the SMSC 140, the home location register 142, the gateway 150, the SGSN 160, the GGSN 162, and the WAP gateway 164 will be referred to as a mobile communication network. In embodiments of the present invention, the mobile communication network is illustrated and described on the assumption that it is implemented by the GSM system, but the mobile communication network may also be implemented by a different mobile communication system, such as a CDMA (Code Division Multiple Access) system, a W-CDMA system, or the like. Those skilled in the art may easily implement a mobile communication network by the CDMA or W-CDMA system, so a detailed description of its architecture will be omitted.

The mobile communication terminal 100 according to the first embodiment of the present invention is adapted to collect measurement data necessary for the network-based location measurement and transmit the data to the SPC 170. When the SPC 170 does not interwork with the mobile communication terminal 100, the collected measurement data is transmitted to the NPS 172.

In the present invention, the measurement data collected for the network-based location measurement by the mobile communication terminal 100 includes information regarding the current servicing system, identity information and OTD values of neighboring base stations, signal intensity (Ec/Io), etc. The information regarding the current servicing system includes the MCC (Mobile Country Code) of a GSM service region, an MNC (Mobile Network Code) for distinguishing between service providers in the GSM network service region, an LAC (Location Area Code) that is a code indicative of the coverage of a GSM base station, CI (Cell Identity) that is the only information used to identify base station information, a BSIC (Base station Identity Code) that is the ID of a neighboring base station, an ARFCN (Absolute Radio Frequency Channel Number) that is an RF channel ID number of the GSM, etc. The measurement data also includes various parameters, such as TA (Timing Advance) that denotes a round trip delay from the base station 110 to the mobile communication terminal 100, measured by the base station 110 in communication with the mobile communication terminal 100 and provided to the mobile communication terminal 100, an RSSI (Received Signal Strength Indicator) corresponding to the overall strength of signals received by the base station 110 that is currently in communication with the mobile communication terminal, an RXLEV (Rx Power Level) that indicates the strength of a signal received by the mobile communication terminal 100, an RXQUAL (Rx Power Quality) that represents the degree of the received signal strength, and so forth. Further, the measurement data includes a BSIC that is an ID number of each neighboring base station, the OTD value of each neighboring base station, corresponding to the difference in received signals between the base station in communication with the mobile communication terminal 100 and a neighboring base station, an RXLEV value that is a parameter indicating the signal strength of each neighboring base station, etc.

In addition, the information regarding the current servicing system, collected by the mobile communication terminal 100, may vary according to the type of a mobile communication system constituting the mobile communication network. That is, when the mobile communication network is implemented by the GSM system, the above-mentioned MCC, MNC, LAC, CI, BSIC, AFRCN, TA, OTD, RxREV, and the like are collected as the information regarding the current servicing system. However, when the mobile communication network is implemented by the CDMA or W-CDMA system, parameters corresponding to each system are collected as the information regarding the current servicing system.

Table 1 shows information regarding the current servicing system, which is collected according to the type of a system constituting the mobile communication network by the mobile communication terminal 100.

TABLE 1

| GSM | CDMA | W-CDMA |
|---|---|---|
| MCC | MCC | MCC |
| MNC | SID/NID | MNC |
| LAC | — | — |
| CI | BSID | UCID |
| ARFCN | FA | FA |
| TA | RTD | RTT |
| OTD | PN Phase | — |
| RxLEV | RxLEV | RxLEV |

In Table 1, the SID/NID denotes a system ID/network ID, the BSID denotes a base station ID, the UCID denotes an upstream channel identifier, the FA denotes frequency assignment, the RTD denotes a round trip delay, the RTT denotes a round trip time, and the PN Phase denotes a pseudo noises phase.

Although it is assumed in the following description that the mobile communication network is implemented by the GSM system, and thus the parameters corresponding to the GSM system in Table 1 are collected and used as the information regarding the current servicing system by the mobile communication terminal 100, this assumption is for the convenience of explanation only, and the parameters corresponding to each of the CDMA and W-CDMA systems in Table 1 are collected and used when the mobile communication network is implemented not by the GSM system but by the CDMA or W-CDMA system.

The base station 110 is arranged in a cell-by-cell basis, and is adapted to receive a request for packet data communication from the mobile communication terminal 100 over a traffic channel among signal channels and to perform location registration, that is, to position the mobile communication terminal 100 that exists in the cell region under the control thereof.

The base station controller 112 controls the base station 110, and interworks with the MSC 120 in such a manner as to allocate wireless channels to the mobile communication terminal 100 or release the channels, control the transmission power of the mobile communication terminal 100 and the base station 110, determine the inter-cell soft handoff and hard handoff, conduct transcoding and vocoding, distribute GPS clocks, operate/maintain/repair the base station, etc. Although the base station controller 112 is typically installed in the MSC 120, it will be assumed for the convenience of explanation that the base station controller 112 is not installed in the MSC 120 and is separated therefrom.

The SMSC 140 provides not only an SMS (Short Message Service) which enables the mobile communication terminal to bidirectionally exchange short messages containing numerals, characters, etc. with various text delivery systems (not illustrated) via a mobile communication network, but also an MMS (Multimedia Message Service) for transmitting multimedia messages (photos, images, moving pictures, etc.) in addition to simple text or voice messages.

The home location register 142 is a database for storing service profiles regarding subscriber information of mobile communication terminal users. The subscriber information includes the telephone number of the subscriber, the MIN (Mobile Identification Number) of the mobile communication terminal, the ESN (Electronic Serial Number) of the terminal, the service type, and information regarding the base station 110 and the MSC 120 controlling the cell where the mobile communication terminal 100 is located.

The MSC 120, the SMSC 140, and the home location register 142 transmit/receive signals with one another via the CCS7 network 130.

The gateway 150 is adapted to convert communication codes or protocols between the mobile communication network and the wired Internet so as to quickly search and display information on the wired Internet. In this way, the gateway 150 interconnects the mobile communication network 110 with other communication networks, including a PSTN (Public Switched Telephone Network), a PSDN (Public Switched Data Network), an ISDN (Integrated Services Digital Network), a B-ISDN (Broad ISDN), an IN (Intelligent Network), a PLMN (Public Land Mobile Network), etc.

The SGSN 160 has a hardware structure suited to provide an ATM-based switch and routing access for a GPRS (General Packet Radio Service), and supports an OS (Operating system) necessary for processing various data services. The OS incorporates a GPRS mobility management function, a GPRS session management function, a GPRS authentication and accounting function, etc.

According to the present invention, the SGSN 160 serves to receive a location measurement request signal transmitted by the mobile communication terminal 100 via the base station 110, and forwards the signal to the SPC 170 or the NPS 172.

The GGSN 162 is a serving node of an IP-based packet network that provides a high-speed packet data service for a data service, and is adapted to provide the packet data service with mobility and process various data-related protocols. Particularly, the GGSN 162 incorporates functions for address allocation, domain address modification, accounting, maintenance/repair, and so forth.

When the mobile communication terminal 100 equipped with a WAP browser transmits a location measurement request signal to the SPC 170 or the NPS 172, the signal is transmitted via the WAP gateway 164 by using the mobile communication network. The WAP gateway 164 receives a request for an Internet service from the mobile communication terminal 100 according to the WAP, converts the request by the TCP/IP (Transmission Control Protocol/Internet Protocol), and transmits the converted request to the SPC 170 or the NPS 172. Contrariwise, the WAP gateway 164 receives response data from the SPC 170 or the NPS 172 according to the TCP/IP, converts the data by the WAP, and transmits the converted data to the mobile communication terminal 100.

The SPC 170 according to the first embodiment of the present invention is a network element for providing an A-GPS (Assisted GPS) service in a user plane scheme defined by the OMA (Open Mobile Alliance) SUPL (Secure User Plane Location) standard, and can simultaneously provide a network-based solution service (G-pCell solution) by using an A-GPS fallback solution that provides much higher location measurement accuracy than in the case of using the cell ID in a region where the A-GPS service is unavailable (e.g. indoor, underground, or any other region that is not open). In order to automatically construct a G-pCell database, the SPC 170 interworks with the NPS 172 in such a manner as to create a separate log file for each A-GPS location measurement from measurement data collected by the mobile communication terminal 100 for the network-based location measurement and periodically transmit the log file to the NPS 172. Alternatively, the SPC 170 creates a log file at each request of the operator and transmits it to the NPS 172. In this way, the SPC 170 provides an interworking function necessary for automatically constructing a G-pCell database.

According to the present invention, for the sake of the interworking between the mobile communication terminal 100 and the SPC 170, a protocol (IS-801 for CDMA-based mobile communication terminals, RRLP for GSM-based mobile communication terminals, and RRC for W-CDMA-based mobile communication terminals) is matched so that A-GPS location measurement can be conducted by using the mobile communication network as the connection path. In order to construct a G-pCell database, the SPC 170 or the NPS 172 requests the mobile communication terminal 100 to collect measurement data for network-based location measurement according to a separately defined protocol, which is conducted in the TCP/IP mode. In this TCP/IP mode, the mobile communication terminal 100 interworks with the SPC 170 or the NPS 172 via the base station 110 of the GSM mobile communication network, the base station controller 112, the SGSN 160, and the GGSN 162 according to the TCP/IP.

The NPS 172 according to the first embodiment of the present invention stores an already constructed G-pCell database. When the NPS 172 interworks with the SPC 170, it requests data necessary for location measurement according to a protocol defined separately from SUPL POS data. As a result of this request, the NPS 172 extracts location-related measurement data that the mobile communication terminal has sent to the SPC, and updates the G-pCell database based on the extracted measurement data.

The SLC 180 is a server for processing result data transmitted as a location measurement result by the SPC 170 and the NPS 172. The SLC 180 interworks with a data network via the WAP gateway 164 and transmits the location measurement result to the mobile communication terminal 100 in an HTTP format.

Although it is assumed herein that, when the SPC 170 receives a location measurement request signal from the mobile communication terminal 100, it searches through the G-pCell database stored in the NPS 172 and transmits the latitude and longitude of a G-pCell ID with the best matching to the SLC 180, which in turn forwards the latitude and longitude to the mobile communication terminal 100 as a location measurement result, the SPC 170 may transmit the location measurement result directly to the mobile communication terminal 100. Alternatively, it is possible for the NPS 172 to receive a location measurement request signal directly from the mobile communication terminal 100 and transmit a location measurement result to the mobile communication terminal 100.

The CP 190 refers to a provider's server for providing the mobile communication terminal 100 with contents based on location measurement.

Figure 2:
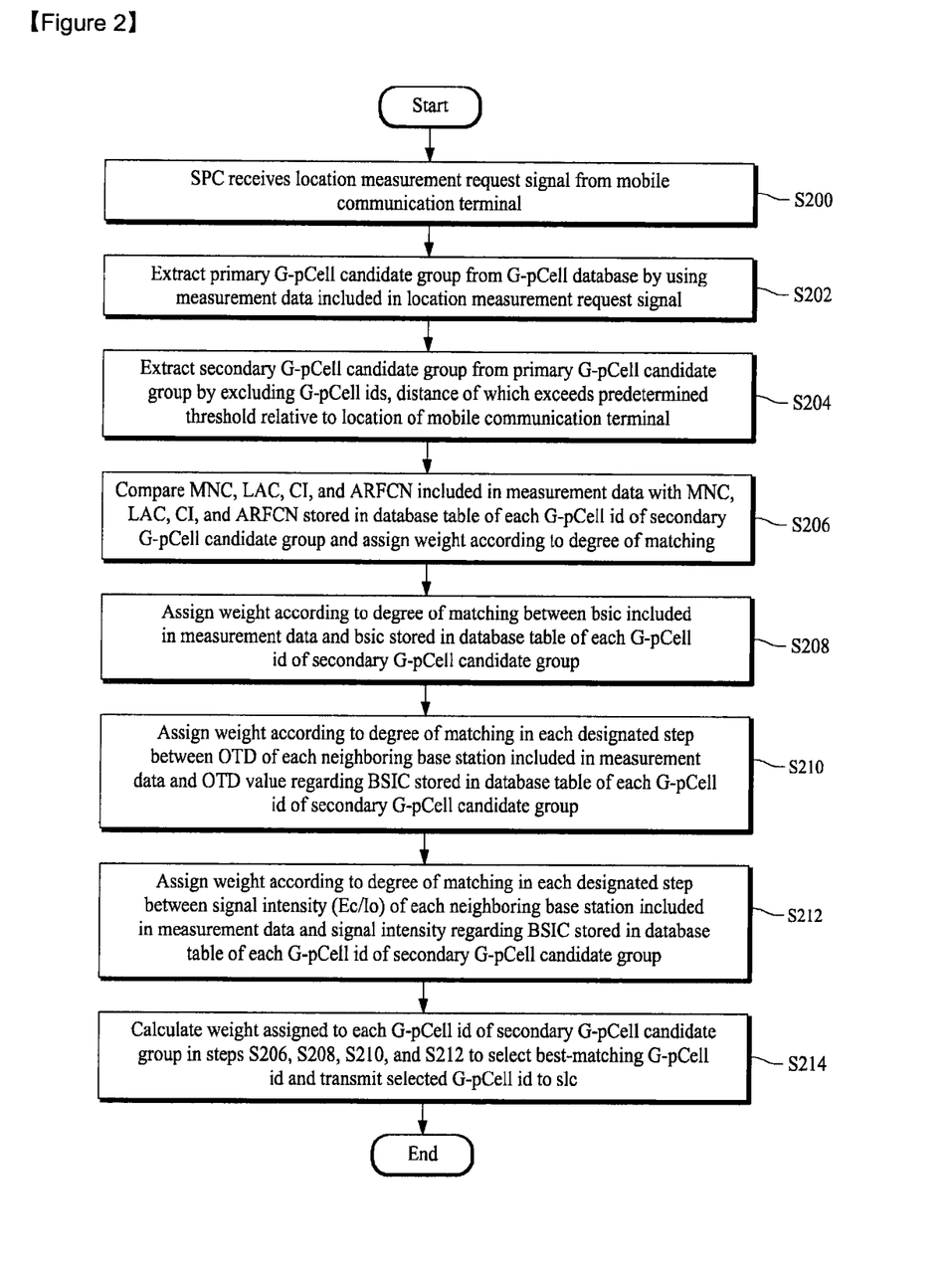
FIG. 2 is a flowchart illustrating a procedure of providing a mobile communication terminal with network-based location measurement by using a G-pCell database in accordance with a preferred embodiment of the present invention.

FIG. 2 illustrates a procedure of providing a mobile communication terminal with network-based location measurement by using a G-pCell database according to the first embodiment of the present invention.

For location measurement, the mobile communication terminal 100 transmits a location measurement request signal to the SPC 170 via the mobile communication network (S200).

In order to provide the mobile communication terminal with network-based location measurement by using a G-pCell database according to this embodiment of the present invention, the NPS 172 must have a G-pCell database constructed and stored therein. A procedure of constructing a G-pCell database will be described later with reference to FIG. 3.

The location measurement request signal transmitted to the SPC 170 by the mobile communication terminal 100 according to the present invention includes measurement data collected by the mobile communication terminal 100 to use the network-based location measurement, such as information regarding the current servicing system, time and distance signals from neighboring base stations, and signal intensity (Ec/Io).

On receiving the location measurement request signal from the mobile communication terminal 100, the SPC 170 interworks with the mobile communication terminal 100 by using a location measurement protocol, in such a manner as to extract a primary G-pCell candidate group by using measurement data included in the location measurement request signal received from the mobile communication terminal 100 (S202).

The location measurement protocol for the interworking between the SPC 170 and the mobile communication terminal 100 according to the present invention is IS-801 when the mobile communication terminal is a CDMA-based terminal, RRLP when a GSM-based terminal, and RRC when a W-CDMA-based terminal.

Using the data of MCC, MNC, LAC, CI, and BSIC of the measurement data included in the location measurement request signal received from the mobile communication terminal 100, the SPC 170 selects G-pCell IDs matching with the MCC, MNC, LAC, CI, and BSIC of the measurement data from the entire G-pCell database stored in the NPS 172 as the primary G-pCell candidate group.

The SPC 170 extracts a secondary G-pCell candidate group from the primary G-pCell candidate group by excluding G-pCell IDs, which are at a distance of a predetermined value or more relative to the location of the mobile communication terminal 100, from the primary G-pCell candidate group (S204).

Step S204 corresponds to a process of excluding G-pCell IDs spaced excessively with respect to the actual location of the mobile communication terminal 100 by finding G-pCell IDs of the primary G-pCell candidate group, which are at a distance greater than a predetermined threshold from the center point of the cells, and excluding them from the primary G-pCell candidate group. It is also possible to apply different thresholds according to cell sizes.

Alternatively, it is possible to calculate the average distance from the center point of the cells for the primary G-pCell candidate group and exclude G-pCell IDs, the distances of which exceed the average distance. Further, based on TA (Timing Advance) corresponding to the distance from the center of the base station 110 currently used by the mobile communication terminal 100 to the mobile communication terminal 100 that has requested location measurement, G-pCell IDs lying out of the range of TA−1~TA+1 may be excluded.

The SPC 170 compares the MNC, LAC, CI, and ARFCN included in the measurement data transmitted by the mobile communication terminal 100 with the MNC, LAC, CI, and ARFCN stored in the database table of each G-pCell ID of the secondary G-pCell candidate group, and then assigns weights according to the degree of matching (S206).

The SPC 170 assigns weights according to the degree of matching between the BSIC corresponding to the ID of a neighboring base station, included in the measurement data, and the BSIC stored in the database table of each G-pCell ID of the secondary G-pCell candidate group (S208).

Also, the SPC 170 assigns weights according to the degree of matching in each designated step between the OTD of each neighboring base station, included in the measurement data transmitted by the mobile communication terminal 100, and the OTD value for the BSIC stored in the database table of each G-pCell ID of the secondary G-pCell candidate group (S210).

Further, the SPC 170 assigns weights according to the degree of matching in each designated step between the signal intensity (Ec/Io) of each neighboring base station, included in the measurement data transmitted by the mobile communication terminal 100, and the signal intensity for the BSIC stored in the database table of each G-pCell ID of the secondary G-pCell candidate group (S212).

The weights assigned to respective G-pCell IDs of the secondary G-pCell candidate group in steps S206, S208, S210, and S212 are calculated to select the best-matching G-pCell ID and transmit the selected G-pCell ID to the SLC 180 (S214).

Although it is assumed herein that all the four criteria included in the measurement data received from the mobile communication terminal 100 are applied to weight assignment based on the degree of matching in steps S206 to S212, the present invention is not limited thereto, and those skilled in the art can combine at least two of the criteria for weight assignment according to the requirements regarding accuracy.

In addition, although it is assumed herein that the mobile communication terminal 100 requests a location service, the CP 190 may request the location service if necessary.

If the SPC 170 fails to extract the primary G-pCell candidate group from the measurement data in step S202, it can provide the mobile communication terminal 100 with location measurement by using any one of the following three methods: a first method including the steps of drawing connection lines between every BSIC based on information regarding the TA related to the location of the mobile communication terminal 100 and every BSIC measured by the mobile communication terminal 100, as well as the latitude and longitude data for each BSIC which corresponds to BSA (Base Station Almanac) information stored in the NPS 172, drawing circles of TA+1 and TA−1 based on the latitude and longitude of the base station currently used by the mobile communication terminal 100, finding the intersection points, and transmitting the center point of the intersection points to the mobile communication terminal 100 as the location measurement result; a second method including the steps of obtaining the center point of a cell in which the mobile communication terminal 100 that has requested location measurement is located, as well as the center point of two adjacent cells, finding the center point of the three vertices, and transmitting the center point to the mobile communication terminal 100 as the location measurement result; and a third method of selecting one of both methods with better location accuracy and transmitting it to the mobile communication terminal 100.

Figure 3:
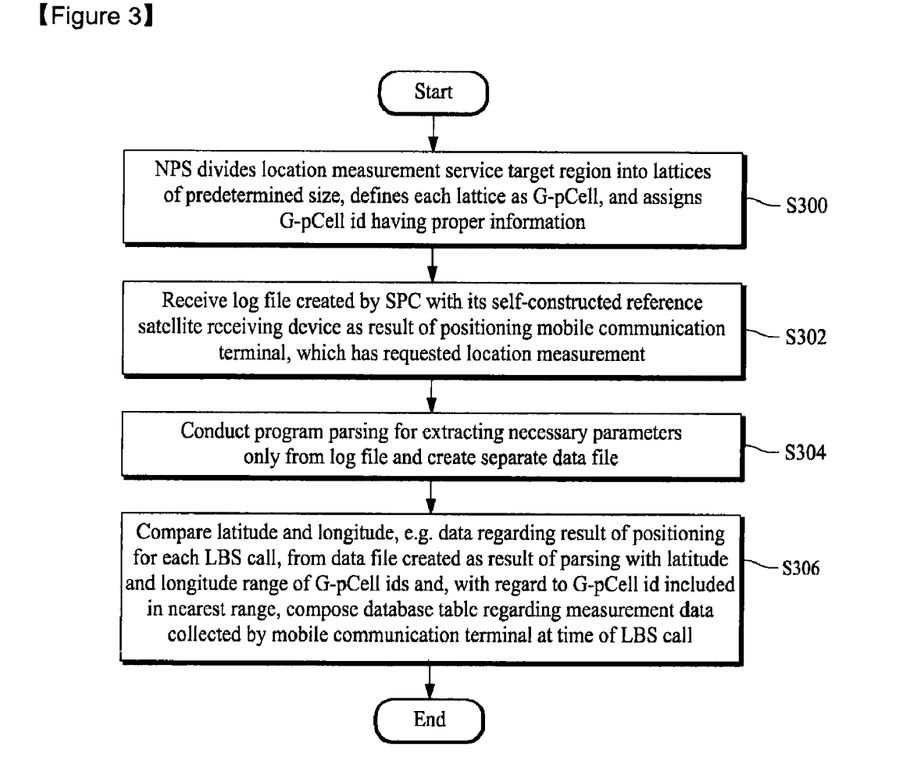
FIG. 3 is a flowchart illustrating a procedure of constructing a G-pCell database in accordance with a preferred embodiment of the present invention.

FIG. 3 illustrates a procedure of constructing a G-pCell database according to the first embodiment of the present invention.

In order to construct a G-pCell database according to the first embodiment of the present invention, the NPS 172 divides the location measurement service target region into predetermined-sized lattices, defines each lattice as a G-pCell, and assigns a G-pCell ID including proper information to each G-pCell (S300).

The proper information of the G-pCell ID assigned to each lattice according to the present invention refers to data regarding the latitude and longitude of the center point of each lattice, as well as the latitude and longitude of four vertices of the lattice. The lattice size may vary depending on the required measurement accuracy, but the target region is preferably divided into squares of 100 m$^{L\lambda}$ 100 m, 50 m$^{L\lambda}$ 50 m, etc.

The SPC 170 uses its self-constructed reference satellite receiving device for positioning the mobile communication terminal 100, which has requested location measurement, to create a log file, and the created log file is received by the NPS 172 (S302).

The satellite positioning data to be matched with each G-pCell ID is obtained in the following manner: when a commercially available satellite positioning data is used, satellite calls with good positioning accuracy are solely selected based on RF characteristic data, which is received by the SPC 170 from the mobile communication terminal 100 for each call positioning of the LBS (Location Based Service), to create a log file. It is also possible to select the result of satellite positioning, which is related to a region requested by a person or which has been simultaneously requested by a number of persons, to create a log file. Alternatively, data with a good positioning result is solely selected from commercially available network-type positioning results to create a log file. It is assumed herein that a log file is created based on satellite positioning data collected from the satellite receiving device.

The SPC 170 separately selects satellite positioning data, which provides an adequate degree of positioning accuracy, from the received satellite positioning data. In the case of A-GPS positioning, the adequate level of positioning accuracy is defined in such manner that at least a predetermined number (e.g. five) of satellites are selected to obtain satellite positioning data, which is supposed to satisfy a required level of uncertainty as a standard for determining the positioning accuracy. In the case of network-type positioning, the positioning accuracy refers to the result of positioning when there are at least a predetermined number (e.g. four) of adjacent cells during the positioning and when every employed cell has no repeater.

Upon receiving a log file from the SPC 170, the NPS 172 conducts program parsing for extracting necessary parameters only and creates a separate data file (S304).

The latitude and longitude, that is, data regarding the result of positioning for each LBS call, derived from the data file created as a result of parsing in step S304, are compared with the latitude and longitude range of G-pCell IDs, and with regard to a G-pCell ID included in the nearest range, a database table containing measurement data collected by the mobile communication terminal 100 at the time of the LBS call is prepared (S306).

A G-pCell database is constructed by preparing the database table for every G-pCell ID.

The database table matching with G-pCell IDs according to the present invention includes system information measured by the mobile communication terminal 100 and measurement data regarding time and distance information of neighboring base stations.

In order to make use of an LBS, the mobile communication terminal 100 must collect basic data. Measurement data basically collected by the mobile communication terminal 100 corresponds to information regarding the current servicing system, including the parameters MCC, MNC, LAC, CI, BSIC, ARFCN, TA (a distance from the base station 110 to the mobile communication terminal 100, measured by the base station in communication with the mobile communication terminal 100 and provided to the mobile communication terminal 100), RSSI, RXLEV, RXQUAL. Also, the measurement data includes the BSIC that is an ID number of each neighboring base station, the OTD value of each neighboring base station, which denotes the difference in received signals between the base station in communication with the mobile communication terminal 100 and an neighboring base station, and the RXLEV value that is a parameter indicating the signal intensity of each neighboring base station.

Figure 4:
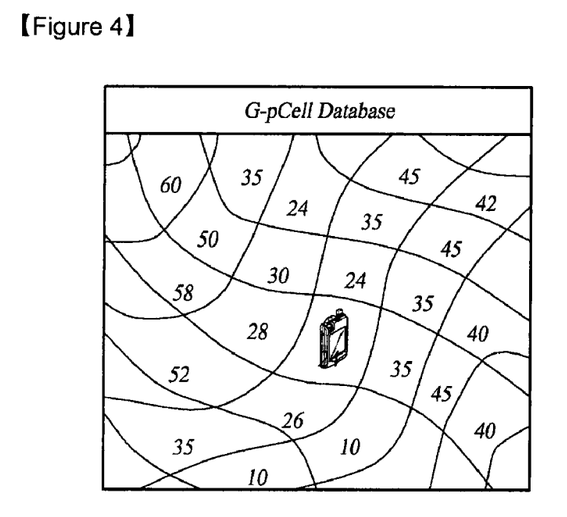
FIG. 4 is a view illustrating a G-pCell database constructed in accordance with a preferred embodiment of the present invention.

FIG. 4 illustrates a G-pCell database constructed according to the first embodiment of the present invention.

As mentioned above, the NPS 172 endows each predetermined-sized G-pCell with a proper G-pCell ID. However, after a G-pCell database is constructed, data stored in the database table of each G-pCell ID is compared to endow the same or similar G-pCell IDs with the same number so that a G-pCell ID group is established.

For example, if data stored in the database table of the first G-pCell ID and data stored in the database table of the second G-pCell ID have the same data, except for the OTD value for each neighboring base station, which denotes the difference in received signals between neighboring base stations, the same number is given to construct a G-pCell ID group as illustrated in FIG. 3.

Figure 5:
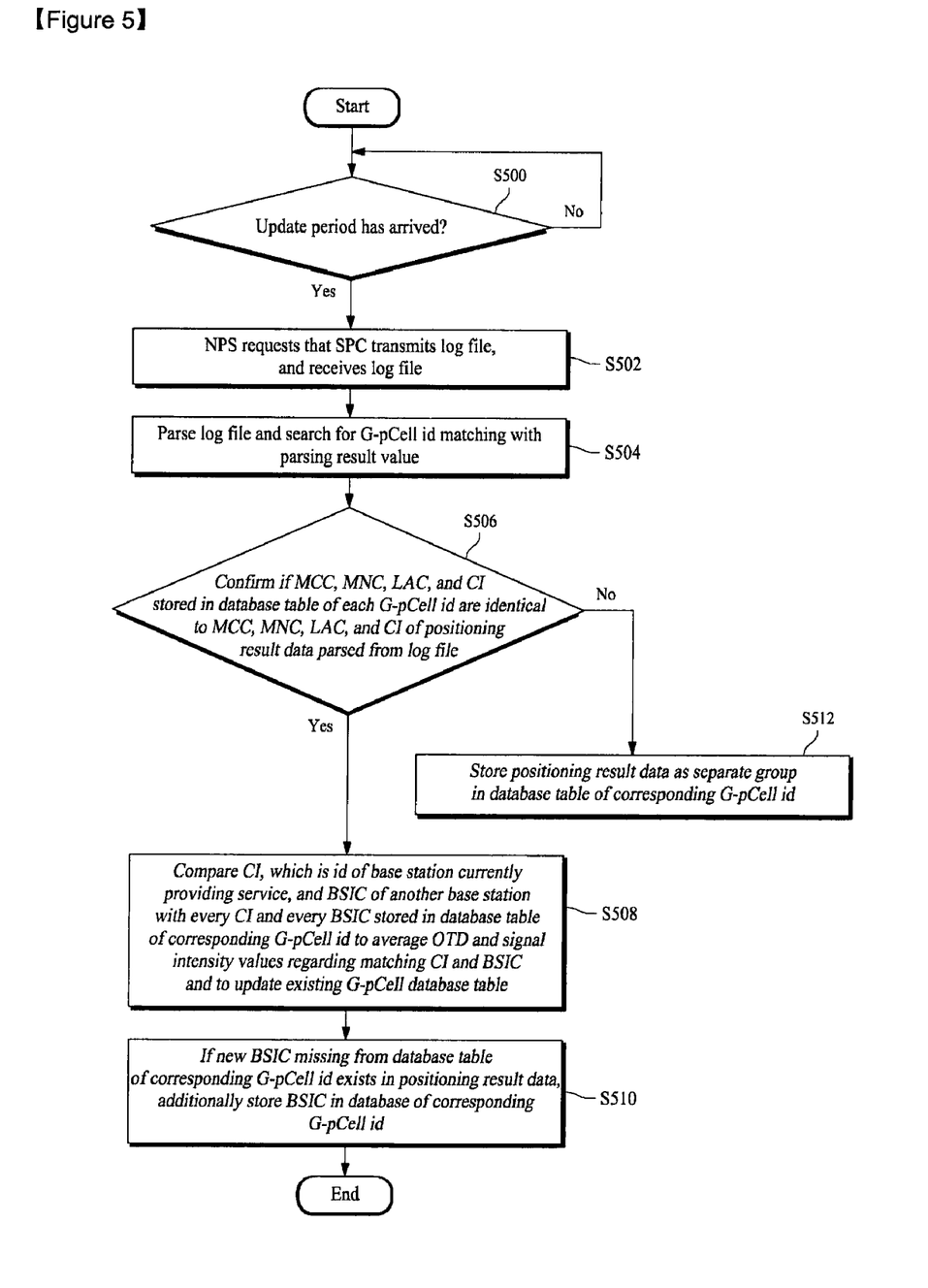
FIG. 5 is a flowchart illustrating a procedure of updating a G-pCell database in accordance with a preferred embodiment of the present invention.

FIG. 5 illustrates a procedure of updating a G-pCell database according to the first embodiment of the present invention.

It should be noted that, even after a database is initially constructed with regard to each G-pCell ID, the G-pCell database according to the first embodiment of the present invention must be continuously updated according to the situation changes of the mobile communication network and the log file created by the SPC 170.

The update procedure is conducted either in an update cycle set by the operator of the network-based positioning system as illustrated in FIG. 1, or every time the operator requests updating. It is assumed herein that the update is conducted in a cycle set by the operator.

The NPS 172 manages its own update cycle and checks if an update period has arrived (S500).

If it is confirmed in step S500 that an update period has arrived, the NPS 172 requests that the SPC 170 transmits a log file, and receives the log file (S502).

Considering that the G-pCell database is continuously updated in the update cycle according to the present invention, the SPC 170 continuously creates and stores a log file from the A-GPS positioning result from the commercial service subscriber. The SPC 170 transmits the log file to the NPS 172 at the request of the NPS 172.

On receiving the log file from the SPC 170, the NPS 172 parses the log file and searches for a G-pCell ID matching with the parsing result value (S504).

Although it is assumed herein that a log file regarding the result of commercially available A-GPS positioning is parsed to update the G-pCell database by the NPS 172, it is also possible to update the G-pCell database based on manual A-GPS positioning result if the A-GPS service is not available in the corresponding region.

The NPS 172 checks if the MCC, MNC, LAC, and CI stored in the database table of each G-pCell are identical to the MC, MNC, LAC, and CI of the positioning result data parsed from the log file (S506).

If it is confirmed in step S506 that the MCC, MNC, LAC, and CI stored in the database table of the G-pCell ID are identical to the MCC, MNC, LAC, and CI of the positioning result data parsed from the log file, the CI of the current servicing base station and the BSIC of another base station are compared with the CI stored in the database table of the corresponding G-pCell and every BSIC to average the OTD and signal intensity values with regard to the matching CI and BSIC and to update them (S508). The OTD and signal intensity values are used as materials to assign a weight to each G-pCell belonging to the above-mentioned secondary G-pCell candidate group.

If a plurality of OTD and signal intensity values regarding the matching BSIC exist in the database table of the G-pCell ID, all OTD and signal intensity values are averaged to update reference data when the OTD or signal intensity values are below a predetermined number (e.g. six). If the values are equal to or larger than the predetermined number, values belonging to a reference range are averaged (i.e. values lying out of upper and lower 20% ranges are excluded, and the remaining values are averaged) to update the reference data.

Assuming that the four parameters MCC, MNC, LAC, and CI are the same and that a BSIC missing from the BSIC list of the database table of the corresponding G-pCell exists only in the positioning result data, the missing BSIC is added to the G-pCell ID database list. Then, the OTD and the signal intensity regarding the added BSIC are stored to update the database table (S510).

If it is confirmed in step S506 that at least one of the MCC, MNC, LAC, and CI stored in the database table of the G-pCell ID does not match with the corresponding MCC, MNC, LAC, and CI of the positioning result data parsed from the log file, the NPS 172 stores the positioning result data as a separate group in the database table of the corresponding G-pCell ID (S512). In this way, even the handoff situation that is likely to occur in the corresponding G-pCell is considered in step S512 to construct a database table and improve the integrity of the database.

In other words, conventional network positioning schemes do not manage data in detail by considering the handoff situation of the mobile communication terminal 100. As a result, the rate of matching with various types of positioning data occurring in the same region decreases, and the positioning accuracy degrades. The present invention solves these problems by introducing the above-mentioned grouping system, and improves the integrity of the database.

Figure 6:
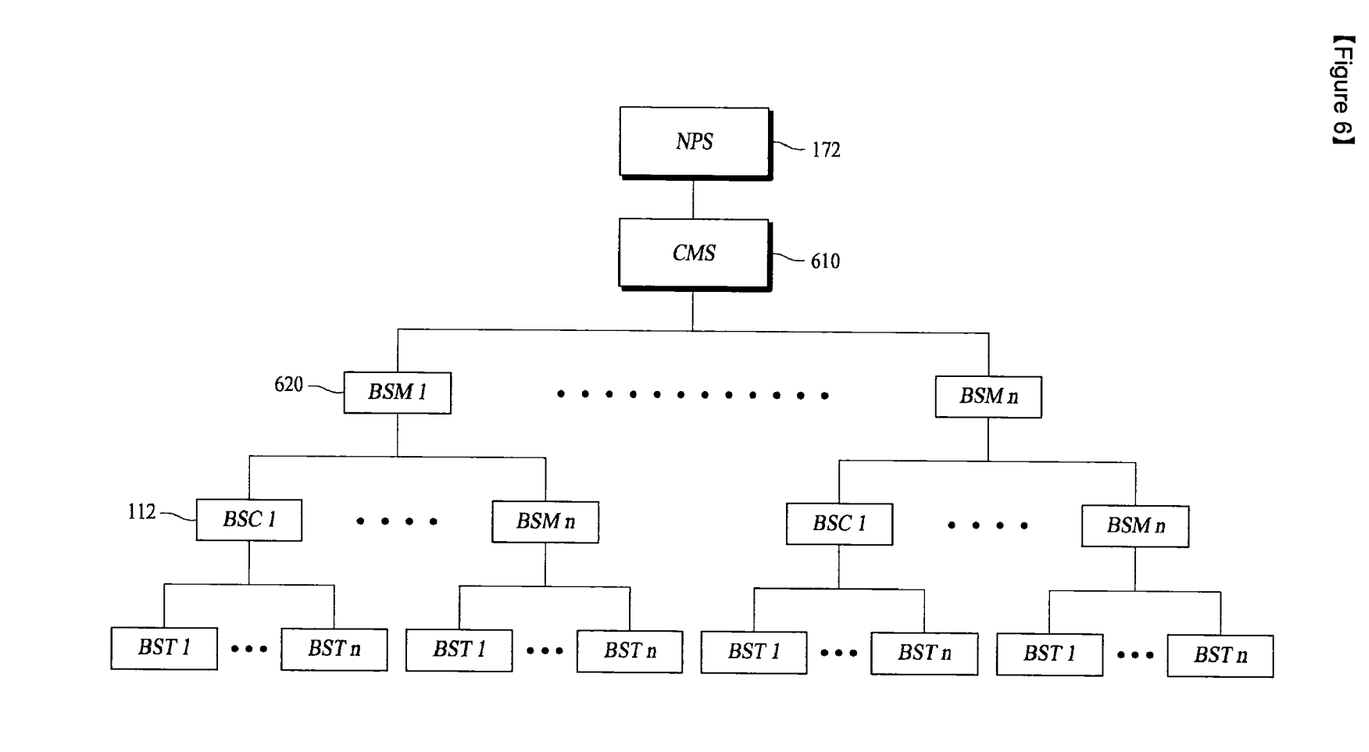
FIG. 6 is a view schematically illustrating a system for reflecting details of change of a base station in a G-pCell database in accordance with a preferred embodiment of the present invention.

FIG. 6 schematically illustrates a system for reflecting details of change of a base station in a G-pCell database according to the first embodiment of the present invention.

According to the present invention, details of change of the base station 110 in the mobile communication network can be reflected in the G-pCell database for optimization of the G-pCell database. Any change of the base station 110 is the outcome of cell planning by the business provider of the mobile communication network, and includes addition, replacement, and deletion of a base station, addition of an exchanger within a base station due to increasing subscribers, modification of name of an exchanger in a specific base station, etc. In order to maintain an optimum database, any change of the base station 110 must be followed by corresponding modification of the database table of the G-pCell ID which belongs to the changed base station. The present invention guarantees that, when the base station changes, the G-pCell database changes in response while interworking with the BSM provided by the business provider of the mobile communication network.

A CMS (Central Management System) 610 for reflecting details of change of the base station in the G-pCell database according to the first embodiment of the present invention interworks with the base station controller 112 contained in the MSC 120 shown in FIG. 1 and with a BSM (Base Station Manager) 620 for managing the base station 110 to manage information regarding all base stations and base station controllers contained in the BSM 620.

In other words, each base station controller 112 manages five base stations 110 and collects information regarding them, each BSM 620 manages five base station controllers 112 and collects information regarding them, and the CMS 610 finally manages five BSMs 620. As such, the CMS 610 collects information regarding changes of base stations from information transmitted from lower elements in the tree structure, and reflects the information in the G-pCell database.

The NPS 172 periodically checks the CMS 610 to confirm whether or not the base station information has changed so that information regarding change of the base station, which occurs depending on the situation of the mobile communication subscriber, is reflected in the G-pCell database. If it is confirmed that the base station information has changed, information regarding the changed base station is received to reflect it in the G-pCell database.

Although it is assumed herein that the NPS 172 periodically checks the CMS 610 to confirm whether or not the base station information has changed, the operator may arbitrarily check if the base station information has changed and reflect the changed base station information, if any, in the G-pCell database. Alternatively, if the base station information has changed, the CMS 610 transmits the changed base station information directly to the NPS 172 so that the changed base station information is reflected in the G-pCell database.

Figure 7:
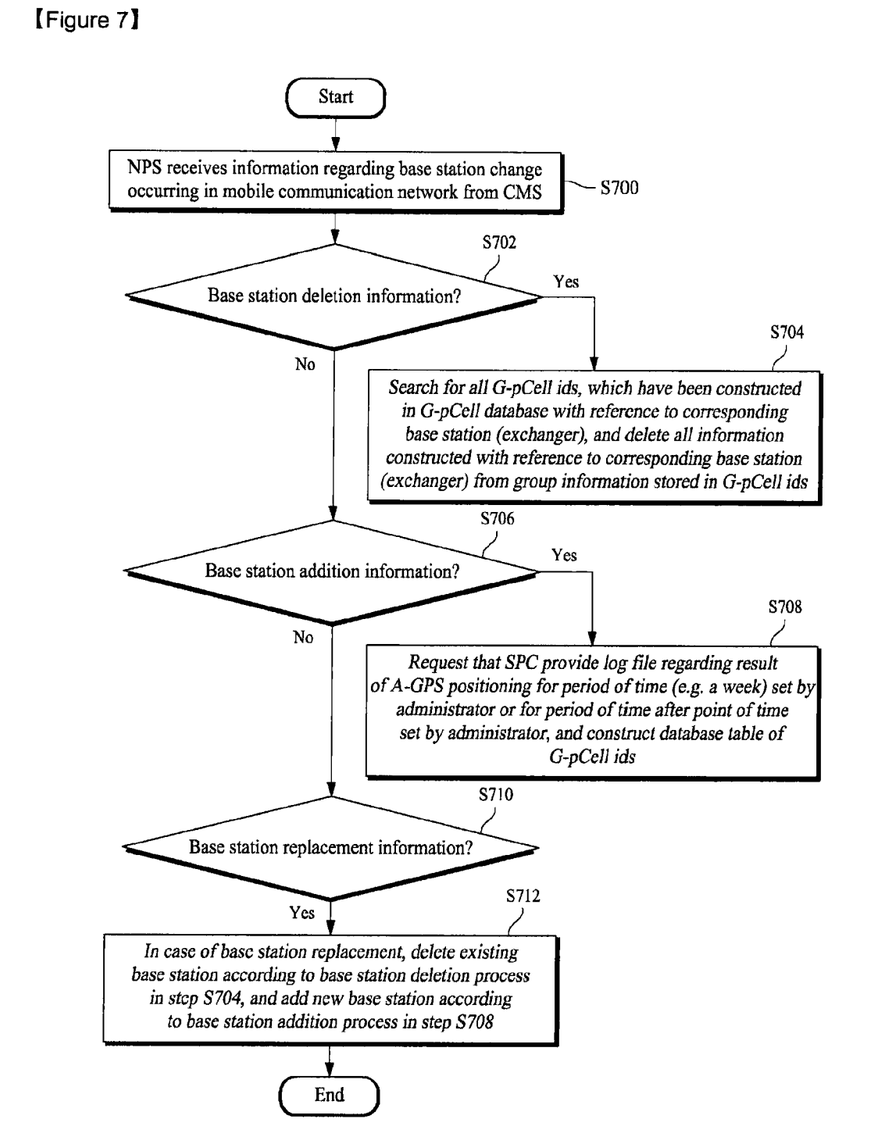
FIG. 7 is a flowchart illustrating a procedure of reflecting details of change of a base station in a G-pCell database in accordance with a preferred embodiment of the present invention.

FIG. 7 illustrates a procedure of reflecting details of change of a base station in a G-pCell database according to the first embodiment of the present invention.

The NPS 172 receives information regarding a base station change that has occurred in the mobile communication network from the CMS 610 (S700).

The operator of the NPS 712 may receive the information regarding a base station change from the CMS 610 at a point of time set by the operator. Alternatively, the information may be transmitted by the CMS 610 in real time every time a base station change occurs. It is assumed herein that the CMS 610 transmits information regarding a base station change to the NPS 172 in real time every time the change occurs.

The NPS 172 searches through the received information and confirms whether or not the information is related to deletion of a base station (S702).

If it is confirmed in step S702 that the received information is related to deletion of a base station (including deletion of an exchanger), the NPS 172 searches for all G-pCell IDs, which have been constructed with reference to the corresponding base station (exchange) in the G-pCell database, and deletes all information constructed with reference to the corresponding base station (exchange) from group information stored in the G-pCell IDs (S704).

If it is confirmed in step 702 that the received information is not related to deletion of a base station (including deletion of an exchanger), the NPS 172 searches through the received information to confirm whether or not the information is related to addition of a base station (S706).

If it is confirmed in step S706 that the received information is related to addition of a base station (including addition of an exchanger), the NPS 172 requests that the SPC 170 provide a log file regarding the result of A-GPS positioning for a period of time (e.g. a week) set by the operator or for a period of time after a point of time set by the operator, and constructs a database table of G-pCell IDs (S708). The G-pCell database is then updated in the above-mentioned manner.

If it is confirmed in step S706 that the received information is not related to addition of a base station (including addition of an exchange), the NPS 172 searches through the received information and confirms whether or not the information is related to replacement of an exchanger (S710).

If it is confirmed in step S710 that the received information is related to replacement of a base station (including replacement of an exchanger), the corresponding base station is deleted, and a new base station is added at the same time. Particularly, the existing base station is deleted according to the base station deletion process in step S704, and a new base station is added according to the base station addition process in step S708 (S712).

In this way, the present invention makes it possible to always maintain the optimum database by continuously updating data based on the result of A-GPS positioning, and directly reflecting details of change of a base station.

Although the first embodiment of the present invention has been described with respect to GSM as a mobile communication system to which the inventive network-based positioning method using a G-pCell database is applied, the present invention is not limited thereto. Those skilled in the art can understand that the inventive positioning method for providing a location-based service can also be applied to W-CDMA, WiBro, etc., in addition to GSM. As used herein, WiBro refers to wireless broadband portable Internet to be commercialized soon, which is aimed at enabling subscribers to use ultra-high speed Internet on the move.

The above-mentioned network-based positioning method using a G-pCell database according to the present invention can be implemented as computer-readable codes implemented on computer-readable recording media. As used herein, the computer-readable recording media include all types of recording devices capable of storing programs or data that can be read by computer systems. Examples of computer-readable recording media include ROMs, RAMs, CD-ROMs, magnetic tapes, hard disks, floppy disks, flash memories, optical data storage devices, etc. As used herein, programs stored in recording media refer to a series of instructions used directly or indirectly in devices capable of processing information (e.g. computers) to obtain specific results. Therefore, contrary to commonly accepted usages, the term "computers" must be interpreted as every type of devices capable of processing information, which are equipped with memories, input/output devices, and processing devices so that specific functions can be conducted according to programs.

The above-mentioned network-based positioning method using a G-pCell database according to the present invention may be written on computers by schematic or VHDL and implemented by a programmable IC, such as FPGA (Field Programmable Gate Array), connected to computers. The recording media include such programmable ICs.

The recording media also include an ASIC (Application Specific Integrated Circuit) obtained by implementing the network-based positioning method as a platform by ICs in an LBS system.

In the foregoing, a network-based positioning method using a G-pCell database (hereinafter referred to as "G-pCell pattern matching algorithm") has been described. Since the G-pCell pattern matching algorithm minimizes the influence of repeaters, it is very advantageous over the TDOA (Time Difference of Arrival) scheme, which is one of triangulation schemes, in that measurement accuracy is superior and there is no need to manage a database of repeaters.

When the G-pCell pattern matching algorithm is used to position the mobile communication terminal 100 within a high-rise building, the pattern of base station signals that the SPC 170 receives from the mobile communication terminal 100 is similar to a G-pCell database constructed in the lower stories based on the outdoors.

However, in the upper stories of a high-rise building, there often occurs a unique radio pattern different from that on the ground. This is because, due to geographical characteristics of the upper stories, a base station signal received from the mobile communication terminal 100 is exposed to a radio environment affected by many neighboring base stations along a line of sight (i.e. a line connected between a transmit antenna and a receive antenna). As a result of this, in the case of positioning the mobile communication terminal 100 in the upper stories of a high-rise building, there is a problem in that location measurement using a G-pCell database constructed on the ground causes a large error.

Usually, a radio wave that the mobile communication terminal 100 receives from the base station in the upper stories of a high-rise building contains more pseudo noise codes (PN code) than those contained in a radio wave that the mobile communication terminal 100 receives from the base station 110 on the ground. Dissimilar to the lower stories, the upper stories of a high-rise building experience a more significant change in the number of PN codes contained a base station signal received from a neighboring base station than a change in the number of PN codes contained in a base station signal received from the base station 110, and the PN codes contained in the base station signal from a neighboring base station are received in great quantities. Thus, in view of characteristics of the G-pCell pattern matching algorithm, there is a problem in that location measurement accuracy is lowered when the number of PN codes of a base station signal received from the mobile communication terminal 100 by the NPS 172 is equal to or greater than a predetermined value.

Reference will now be made to a system and method for positioning a mobile communication terminal 100 according to a second preferred embodiment of the present invention, in which the NPS 172 parses a base station signal received from the mobile communication terminal 100, and selects either the G-pCell pattern matching algorithm or the conventional triangulation scheme, that is, the TDOC scheme, as a location measurement algorithm according to the parsed number of base stations neighboring the mobile communication terminal 100, thereby preventing location measurement accuracy from being lowered when the G-pCell pattern matching algorithm is used to position the mobile communication terminal 100 in the upper stories of a high-rise building.

The system for providing a mobile communication system with network-based location measurement by using a G-pCell database according to the second embodiment of the present invention is the same as the system for providing a mobile communication system with network-based location measurement by using a G-pCell database according to the first embodiment of the present invention, which has been described with reference to FIG. 1, except that the SPC 170 and NPS 172 have different functions and databases than in the system according to the first embodiment. In the following description, the same or similar parts and elements as those described above through FIG. 1 will not be described, and only the functions of the SPC 170 and the NPS 172 according to the second embodiment of the present invention will be described.

The NPS 172 according to the second embodiment of the present invention has a neighboring base station database into which the number of base stations neighboring the mobile communication terminal 100 is incorporated according to the surrounding environment regarding the location of the base station 110.

According to the present invention, the neighboring base station database is a database into which the number of base stations neighboring the mobile communication terminal 100 is incorporated according to the location of the base station 110 and the height of the base station 110 within a high-rise building. The number of all PN codes contained in a base station signal received from a neighboring base station by the mobile communication terminal 100 is incorporated as the number of neighboring base stations into the database when the mobile communication network is implemented by the CDMA system, and the number of neighboring base stations is incorporated into the database by using the OTD of a base station signal received from a neighboring base station by the mobile communication terminal 100 when the mobile communication network is implemented by the GSM system.

Also, in the neighboring base station database according to the present invention, a location area of the base station 110 is classified into a downtown central area, a downtown area, a sub-central area, etc. according to the degree of denseness of high-rise buildings and according to whether or not the base station 110 is located in the upper stories of a high-rise building. The number of base stations neighboring the mobile communication terminal 100 in the upper stories of a high-rise building located in a downtown central area, a downtown area, a sub-central area, etc. constitutes the neighboring base station database.

For example, an area where high-rise buildings stand closely together. such as Myeong-dong, Jongno, and Gangnam station in Seoul, is a downtown central area, and the number of PN codes (e.g. seven or more) of a base station signal received by the mobile communication terminal 100 in the upper stories (above the sixth floor) of a high-rise building (e.g. ten- or more story building) located in the downtown central area is measured to incorporate the number of neighboring base stations into the database. Also, an area where high-rise buildings are scattered, such as Bulgwang-dong, Sindorim-dong, and Gaepo-dong in Seoul, is a downtown area, and the number of PN codes (e.g. six or more) of a base station signal received by the mobile communication terminal 100 in the upper stories of a high-rise building located in the downtown area is measured to incorporate the number of neighboring base stations into the database. Further, an area where there is a little high-rise buildings, such as Gwangmyeong, Hanam, and Yongin in the provinces, is a sub-central area, and the number of PN codes (e.g. five or more) of a base station signal received by the mobile communication terminal 100 in the upper stories of a high-rise building located in the sub-central area is measured to incorporate the number of neighboring base stations into the database.

As mentioned above, the number of PN codes is incorporated as the number of neighboring base stations into the database when the mobile communication network is implemented by the CDMA system, and the number of neighboring base stations is incorporated into the database by using the OTD when the mobile communication network is implemented by the GSM system.

The SPC 170 according to the second embodiment of the present invention incorporates a TODA-based location measurement algorithm corresponding to the conventional triangulation scheme, as well as the G-pCell pattern matching algorithm for conducting network-based location measurement by using a G-pCell database.

On receiving a location measurement request signal from the mobile communication terminal 100, the SPC 170 according to the second embodiment of the present invention interworks with the mobile communication terminal 100 by using a location measurement protocol, in such a manner as to receive a base station signal received by the mobile communication terminal 100, identify the base station 110 by confirming information (SID/NID, BSID, etc. in the case of the mobile communication network implemented by the CDMA system; MNC, etc. in the case of the mobile communication network implemented by the GSM system) regarding the current servicing system, included in the received base station signal, discover the stored number of neighboring base stations in an area where the base station 110 is located by checking the neighboring base station database stored in the NPS 172, detecting the number of base stations neighboring the mobile communication terminal 100 by using the base station signal received from the base station 110 by the mobile communication terminal 100, and then position the mobile communication terminal 100 by using the G-pCell pattern matching algorithm when the detected number of base stations neighboring the mobile communication terminal 100 is less than the stored number of neighboring base stations, discovered through the neighboring base station database, or position the mobile communication terminal 100 by using the TDOA-based location measurement algorithm when the detected number of base stations neighboring the mobile communication terminal 100 is equal to or greater than the stored number of neighboring base stations, discovered through the neighboring base station database.

Figure 8:
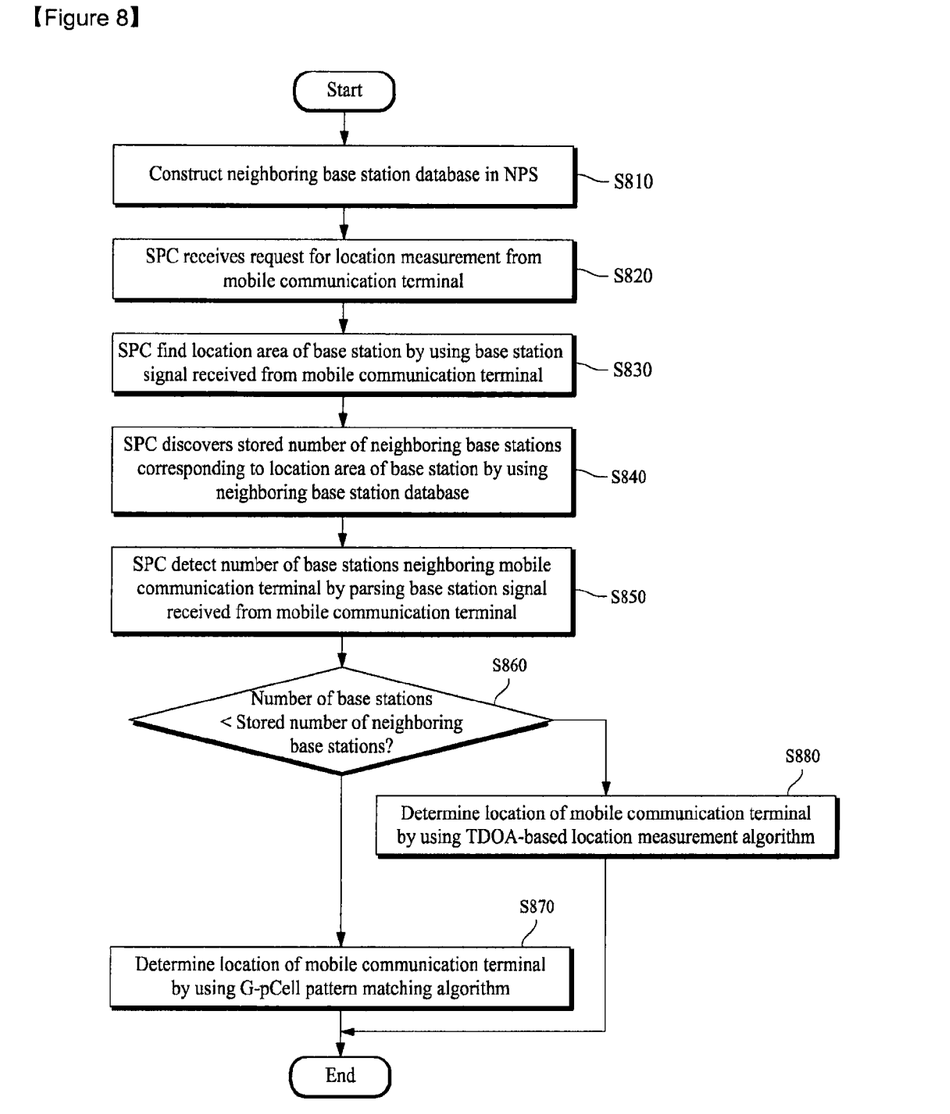
FIG. 8 is a flowchart illustrating a procedure of providing a mobile communication terminal with network-based location measurement by using a G-pCell database in accordance with another preferred embodiment of the present invention.

FIG. 8 illustrates a procedure of providing a mobile communication terminal with network-based location measurement by using a G-pCell database according to the second embodiment of the present invention.

The SPC 170 incorporates the G-pCell pattern matching algorithm and the TDOA-based location measurement algorithm that is a type of triangulation scheme, and the neighboring base station database is constructed in the NPS 172 (S810). In such a state, when the SPC 170 receives a request for location measurement from the mobile communication terminal 100 (S820), it interworks with the mobile communication terminal 100 by using a location measurement protocol, in such a manner as to receive a base station signal received from the base station 110 by the mobile communication terminal 100 and parse information regarding the current servicing system, included in the base station signal, thereby locating the base station 110 (S830).

On locating the base station 110, the SPC 170 discovers the stored number of neighboring base stations in the location area of the base station 110 by using the neighboring base station database stored in the NPS 172 (S840).

With regard to this, the SPC 170 can find the location area of the base station 110 by parsing network parameters included in the base station signal received from the mobile communication terminal 100, and discover the number of neighboring base stations corresponding to the location of the base station 110 by checking the neighboring base station database. That is, when the location of the base station 110, found by parsing the information regarding the current servicing system, is the tenth floor of a specific high-rise building located in Myeong-dong, the SPC 170 can discover a number of seven or more, which is the number of neighboring base stations corresponding to the upper stories of a high-rise building located in a downtown central area, from the neighboring base station database stored in the NPS 172.

On discovering the location of the base station 110 and thus the stored number of neighboring base stations in this way, the SPC 170 detects the number of base stations neighboring the mobile communication terminal 100 by parsing the base station signal received from the mobile communication terminal 100 (S850).

The SPC 170 compares the number of base stations neighboring the mobile communication terminal 100, detected in step S850, with the stored number of neighboring base stations, discovered in step S840, to confirm if the number of base stations is less than the stored number of neighboring base stations (S860).

If it is confirmed in step S860 that the number of base stations is less than the stored number of neighboring base stations, the SPC 170 determines the location of the mobile communication terminal 100 by using the G-pCell pattern matching algorithm already provided therein (S870). Contrarily, if it is confirmed that the number of base stations is equal to or greater than the stored number of neighboring base stations, the SPC 170 determines the location of the mobile communication terminal 100 by using the TDOA-based location measurement algorithm already provided therein (S880).

In other words, the SPC 170 compares the number of base stations neighboring the mobile communication terminal 100, detected by parsing the base station signal received from the mobile communication terminal 100, with the stored number of neighboring base stations, corresponding to the location of the base station 110, and positions the mobile communication terminal 100 by using the G-pCell pattern matching algorithm only when the number of base stations is less than the stored number of neighboring base stations, thereby preventing a decrease in accuracy, which may occur in the upper stories of a high-rise building when the G-pCell pattern matching algorithm is used for positioning, and determining the location of the mobile communication terminal 100 with higher accuracy by using the TDOA-based location measurement algorithm.

A method of positioning the mobile communication terminal 100 by using the G-pCell pattern matching algorithm has been described above through FIGS. 1 to 7, so a detailed description thereof will be omitted. Further, those skilled in the art can easily practice a method of positioning the mobile communication terminal 100 by using the TDOA-based location measurement algorithm, so a detailed description thereof will also be omitted.

When the mobile communication network is implemented by the CDMA system, the number of base stations neighboring the mobile communication terminal 100 can be detected by the number of PN codes. In contrast to this, when the mobile communication network is implemented by the GSM system, the number of base stations neighboring the mobile communication terminal 100 can be detected using not the number of PN codes, but the OTD.

INDUSTRIAL APPLICABILITY

As described above, considering the fact that the accuracy of location measurement may be lowered when the G-pCell pattern matching algorithm is applied to the upper stories of a high-rise building in an area where high-rise buildings stand closely together, such as a downtown area, the present invention selectively uses the G-pCell pattern matching algorithm or a location measurement algorithm based on triangulation to position a mobile communication terminal according to a rough location of the mobile communication terminal, thereby further improving the accuracy of location measurement.

The invention claimed is:

1. A system for providing a mobile communication terminal with network-based location measurement through a mobile communication network by using a G-pCell database, the system comprising:
    an NPS (Network Position Server) for storing a neighboring base station database and a G-pCell database; and
    an SPC (SUPL (Secure User Plane Location) Positioning Center) for detecting a location of a base station by parsing a base station signal received from the mobile communication terminal when a location measurement request signal is received from the mobile communication terminal, and determining a location of the mobile communication terminal by using a G-pCell pattern matching algorithm when the number of base stations neighboring the mobile communication terminal, detected by parsing the base station signal, is less than the stored number of neighboring base stations corresponding to the location of the base station, discovered using the neighboring base station database.

2. The system as claimed in claim 1, wherein the neighboring base station database comprises a database into which the number of base stations neighboring the mobile communication terminal is incorporated according to the location of the base station.

3. The system as claimed in claim 2, wherein the neighboring base station database is constructed by classifying the location of the base station into several location areas according to the degree of denseness of high-rise buildings and according to whether or not the base station is located in the upper stories of the pertinent high-rise building, and parsing a base station signal, which the mobile communication terminal receives from a neighboring base station in each of the classified location areas, to incorporate the number of neighboring base stations into the neighboring base station database.

4. The system as claimed in claim 3, wherein, when the mobile communication network is implemented by a CDMA (Code Division Multiple Access) system, the number of PN (Pseudo Noise) codes of the base station signal, which the mobile communication terminal receives from the neighboring base station in each of the classified location areas, is incorporated as the number of neighboring base stations into the neighboring base station database.

5. The system as claimed in claim 3, wherein, when the mobile communication network is implemented by a GSM (Global System for Mobile Communication) system, the number of neighboring base stations is incorporated into the neighboring base station database by using an OTD (Observed Time Difference) of the base station signal that the mobile communication terminal receives from the neighboring base station in each of the classified location areas.

6. The system as claimed in claim 1, wherein the SPC determines the location of the mobile communication terminal by using a location algorithm based on a TDOA (Time Difference of Arrival) scheme when the number of base stations neighboring the mobile communication terminal is equal to or greater than the stored number of neighboring base stations.

7. A method of providing a mobile communication terminal with network-based location measurement through a mobile communication network by using a G-pCell database in a system including the mobile communication network, an SPC (SUPL (Secure User Plane Location) Positioning Center), and an NPS (Network Position Server), the method comprising the steps of:
(a) receiving a location measurement request signal from the mobile communication terminal;
(b) receiving a base station signal from the mobile communication terminal to detect a location of a base station;
(c) discovering the stored number of neighboring base stations corresponding to the location of the base station by using a neighboring base station database stored in the NPS;
(d) detecting the number of base stations neighboring the mobile communication terminal by parsing the base station signal; and
(e) when the number of the base stations neighboring the mobile communication terminal is less than the stored number of the neighboring base stations, determining a location of the mobile communication terminal by using a G-pCell pattern matching algorithm.

8. The method as claimed in claim 7, further comprising, after step (e), the step of:
(f) determining the location of the mobile communication terminal by using a location algorithm based on a TDOA (Time Difference of Arrival) scheme when the number of base stations neighboring the mobile communication terminal is equal to or greater than the stored number of neighboring base stations.

* * * * *